Patented Nov. 26, 1940

2,223,120

UNITED STATES PATENT OFFICE 2,223,120

CASEIN RESIN

John J. Murray, Arlington, Mass.

No Drawing. Application June 15, 1938,
Serial No. 213,934

4 Claims. (Cl. 260—6)

This invention relates to a casein resin and a method of producing the same.

Casein products have been widely used in the manufacture of paints, glues and other materials, but the range of application of these casein products has been limited because of the lack of water resistance thereof. The present product may be produced in a water solution, but when dry is permanently water resistant.

The product, moreover, has an affinity for alcohol and alcohols may be used with it without coagulating it or causing separation.

In carrying out the process, the casein is heated in the presence of a catalyst under pressure to produce the irreversible casein solution.

As an example of the process, 108 lbs. of urea were dissolved in 36 gals. of ethyl alcohol and 47 gals. of water. 200 lbs of dry casein was then added and mixed until all the lumps were broken up and a pasty reaction mass had formed, after which 1⅜ gals. of 28° Bé. ammonium hydroxide was added and the mixture heated to at least 100° F. This temperature was maintained for about ½ hour to thin the casein urea paste. In the meantime, a solution of 3 lbs. of chromium trioxide and 3 gals. of water was prepared.

After the heating time had elapsed the chromium trioxide solution was slowly added to the mixture, the latter being stirred well during the addition. After all of the chromium trioxide has been added, the mixture is placed in a sealed container and heated to produce a gauge pressure of at least 1½ atmospheres.

The latter heating should be carried out in the presence of a catalyst and preferably in the presence of aluminum and chromium. When a chromium compound is used as an oxidizing agent, it is sufficient to employ an aluminum container and this is the preferred combination.

In ordinary cases, the final step may be controlled by the pressure, the heating being stopped as soon as the requisite pressure has been reached.

The product may be thinned with alcohols or ketones, glycerine or other solvents and may then be mixed, if desired, with other materials, such as are desirable for the manufacture of a paint or other coating composition. The material may likewise be used directly or in diluted form as an adhesive.

The finished material may not be diluted with water. If more water is to be incorporated in the final product, it should be done prior to the final heating operation.

The effect of the chromium is to prevent gelling of the product. If no chromium is introduced, the casein urea mixture slowly forms a gell.

Any anti-gelling agent may replace the chromium trioxide and any suitable amide such as thiourea can be used in place of the urea.

The reaction of the casein and urea is not thoroughly understood. Before the ammonia is added, the casein and urea react and swell to a pasty mass. This reaction occurs in from 5 to 10 minutes without extraneous heat. When the ammonia is added and the mixture cooked, the paste dissolves and thins to the proper extent.

The urea and casein should be approximately in the ratio of 2 parts of casein to 1 part of urea, but the proportions of water or alcohol may be varied. There is no apparent minimum of water, but the amount of alcohol and other solvent should be large enough to keep the mixture from gelling or spoiling. The amount given in the specific example is approximately a minimum amount for the alcohol.

The cooking under pressure thins the mixture, the higher the pressure the thinner the mixture becomes with the same constituents. Ordinarily, a gauge pressure of between 24 and 33 pounds provides suitable results.

The foregoing detailed description has been given for clearness of understanding only, and no unnecessary limitations should be understood therefrom but the appended claims should be construed as broadly as permissible in view of the prior art.

I claim:

1. The method which comprises reacting casein and a urea to form a paste, and thinning the paste with ammonia, by cooking the paste in the presence of an excess of ammonia under superatmospheric pressure.

2. The method which comprises reacting casein with a urea, heating the reaction product with ammonia and an inert organic solvent under superatmospheric pressure to produce a casein compound insoluble in water upon evaporation of the ammonia.

3. A composition of matter including an inert organic solvent, ammonia, and a pressure cooked reaction product of casein and a urea.

4. A coating composition including a casein urea pressure cooked reaction product, ammonia, water, and an inert organic solvent.

JOHN J. MURRAY.